United States Patent Office 2,718,518
Patented Sept. 20, 1955

2,718,518
TRISAZO DYESTUFFS

Fritz Suckfüll, Leverkusen-Wiesdorf, and Paul Zervas, Koln-Dellbruck, Germany, assignors to Farbenfabriken Bayer Aktiengesellschaft, Leverkusen, Germany, a corporation of Germany No Drawing. Application April 9, 1952,
Serial No. 281,461

Claims priority, application Germany April 23, 1951

5 Claims. (Cl. 260—173)

The present invention relates to new trisazo dyestuffs and to a method of making the same; more particularly it relates to trisazo dyestuffs corresponding to the general formula:

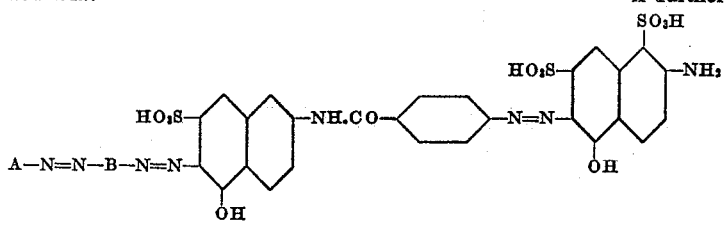

In this formula A—N=N—B— stands for the radical of a diazotized aminomonoazo dyestuff containing at least one sulfonic acid group.

The new trisazo dyestuffs can be obtained by coupling a diazotized aminomonoazo dyestuff containing at least one water-solubilizing group such as the sulfonic or the carboxylic acid group and wherein A and B of the above formula may belong to benzene or naphthalene series, with 2-(4'-aminobenzoylamino)-5-hydroxynaphthalene-7-sulfonic acid, further diazotizing the aminodisazo dyestuff thus obtained and coupling it with 2-amino-5-hydroxynaphthalene-1,7-disulfonic acid.

The new trisazo dyestuffs yield on cotton and fibres of regenerated cellulose red to blue-violet dyeings which can be diazotized on the fibre and developed with 2-hydroxynaphthalene to bluish red to reddish blue shades. The new dyestuffs excel known dyestuffs containing as final component 2-amino-5-hydroxynaphthalene-7-sulfonic acid instead of 2-amino-5-hydroxynaphthalene-1,7-disulfonic acid in essentially clearer shades of the dyeings developed with 2-hydroxynaphthalene.

The following examples illustrate the present invention without, however, limiting it thereto, the parts being by weight:

Example 1

201 parts of 1-amino-2,4-dimethylbenzene-6-sulfonic acid are diazotized with 69 parts of sodium nitrite in hydrochloric acid solution at 5° C. 137 parts of 1-amino-2-methoxy-5-methylbenzene are added to the diazo compound, and coupling is being finished by adding sodium acetate. The isolated monoazo dyestuff is dissolved in caustic soda solution and after adding 69 parts of sodium nitrite indirectly diazotized at 5 to 8° C. The diazo compound thus obtained is coupled in sodium carbonate alkaline medium with 358 parts of 2-(4'-aminobenzoylamino)-5-hydroxynaphthalene-7-sulfonic acid at 0° C.; the disazo dyestuff is isolated. It is slurried up and if further diazotized with 69 parts of sodium nitrite for 1½ hours at 20° C.; the final coupling is performed in sodium carbonate alkaline medium with 319 parts of 2-amino-5-hydroxynaphthalene-1,7-disulfonic acid at 0° C. After being isolated and dried, the trisazo dyestuff represents a dark powder which easily dissolves in water with a violet color. When dyed on cotton and developed with 2-hydroxynaphthalene, a very clear violet is obtained.

In the form of the free acid the dyestuff corresponds to the formula:

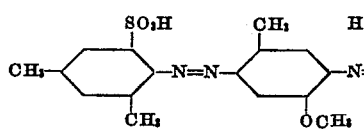

Example 2

When replacing in Example 1 the 1-amino-2-methoxy-5-methylbenzene by 121 parts of 1-amino-2,5-dimethylbenzene, a dyestuff is obtained which, after developing with 2-hydroxynaphthalene, dyes cotton very clear ruby shades.

As free acid the dyestuff corresponds to the formula:

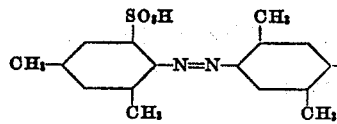

Example 3

When replacing in Example 1 the 1-amino-2-methoxy-5-methylbenzene by 153 parts of 1-amino-2,5-dimethoxybenzene, a dystuff is obtained which, after developing with 2-hydroxynaphthalene, dyes cotton clear blue-violet shades.

The dyestuff corresponds as free acid to the formula:

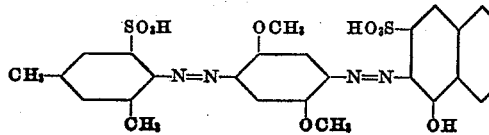

Example 4

173 parts of 1-aminobenzene-3-sulfonic acid are diazotized with 69 parts of sodium nitrite and coupled with 107 parts of 1-amino-3-methylbenzene. After further diazotizing at 20° C. it is coupled with 358 parts of 2-(4'-aminobenzoylamino)-5-hydroxynaphthalene-7-sulfonic acid in the presence of sodium bicarbonate and the disazo dyestuff is isolated. Further diazotizing is performed with 69 parts of sodium nitrite at 20° C., and final coupling is carried through with 319 parts of 2-amino-5-hydroxynaphthalene-1,7-disulfonic acid in sodium carbonate alkaline medium. After being isolated and dried, the dyestuff represents a dark powder. When dyed on cotton and developed with 2-hydroxynaphthalene, a very clear Bordeaux is obtained.

The new dyestuff corresponds in the form of the free acid to the formula:

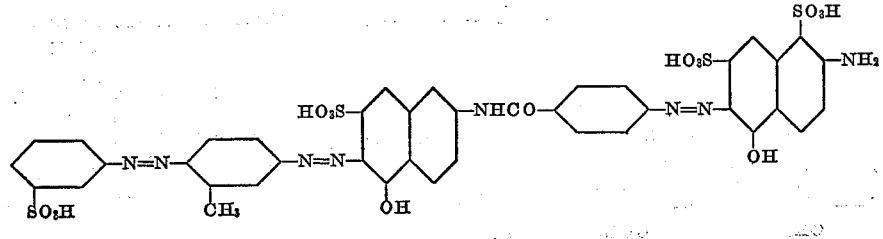

We claim:

1. Trisazo dyestuffs corresponding as free acids to the general formula:

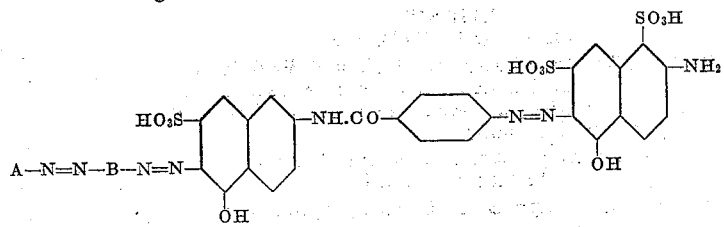

wherein A is an aromatic monosulfuric acid radical of the benzene series, and B is an aromatic radical of the benzene series free from sulfonic acid radicals.

2. The trisazo dyestuff corresponding as free acid to the formula:

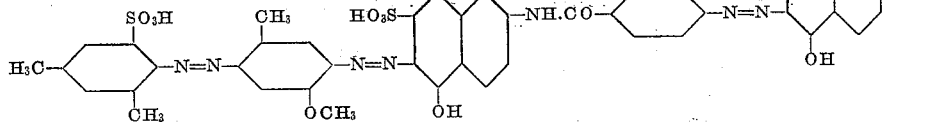

3. The trisazo dyestuff corresponding as free acid to the formula:

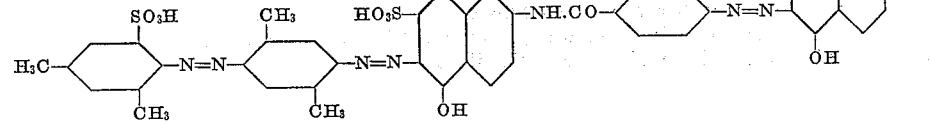

4. The trisazo dyestuff corresponding as free acid to the formula:

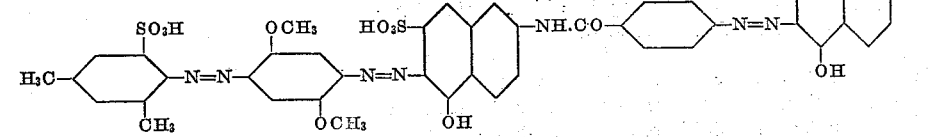

5. The trisazo dyestuff corresponding as free acid to the formula:

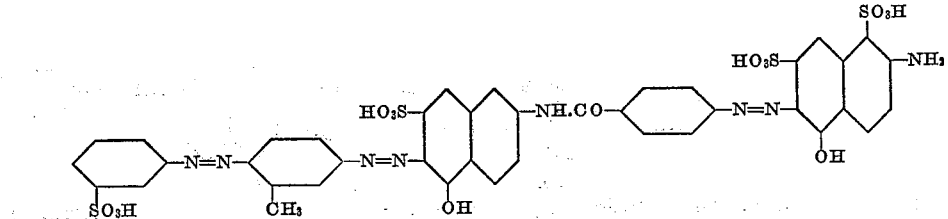

References Cited in the file of this patent

UNITED STATES PATENTS

| | | |
|---|---|---|
| 1,716,098 | Woodward | June 4, 1929 |
| 2,351,118 | Haddock | June 13, 1944 |